(12) United States Patent
Wang

(10) Patent No.: US 11,272,357 B2
(45) Date of Patent: Mar. 8, 2022

(54) METHOD AND DEVICE FOR DETERMINING SIM CARD INFORMATION

(71) Applicant: ZTE Corporation, Shenzhen (CN)

(72) Inventor: Xiaobing Wang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 642 days.

(21) Appl. No.: 16/303,720

(22) PCT Filed: Sep. 27, 2016

(86) PCT No.: PCT/CN2016/100390
§ 371 (c)(1),
(2) Date: Nov. 21, 2018

(87) PCT Pub. No.: WO2017/201934
PCT Pub. Date: Nov. 30, 2017

(65) Prior Publication Data
US 2020/0396596 A1 Dec. 17, 2020

(30) Foreign Application Priority Data
May 27, 2016 (CN) .......................... 201610363606.0

(51) Int. Cl.
*H04W 88/06* (2009.01)
*H04W 8/24* (2009.01)
(Continued)

(52) U.S. Cl.
CPC ............... *H04W 8/24* (2013.01); *H04W 4/06* (2013.01); *H04W 8/183* (2013.01); *H04W 12/03* (2021.01); *H04W 12/40* (2021.01)

(58) Field of Classification Search
None
See application file for complete search history.

(56) References Cited

U.S. PATENT DOCUMENTS

2015/0106900 A1* 4/2015 Pinski ..................... H04W 4/02
726/7

FOREIGN PATENT DOCUMENTS

| CN | 102917339 A | 2/2013 |
| CN | 105101167 A | 11/2015 |

(Continued)

OTHER PUBLICATIONS

International Search Report for corresponding application PCT/CN2016/100390 filed on Sep. 27, 2016; dated Feb. 21, 2017.

*Primary Examiner* — Gary Lafontant
(74) *Attorney, Agent, or Firm* — Cantor Colburn LLP

(57) ABSTRACT

Provided are a method and device for determining Subscriber Identity Module (SIM) card information. The method includes that: negotiation with a terminal is performed to establish a session Identifier (ID) channel; SIM card information allocated for the terminal by a network-side server is acquired; and the SIM card information is sent to the terminal through the session ID channel. With adoption of the technical solutions, the problem in the related art that a large storage space is wasted and a SIM card information acquisition flow is complex because the SIM card information may be acquired only through a physical SIM card is solved, a physical SIM card form is not required, cost is greatly reduced and, meanwhile, a SIM card information acquisition process is simplified.

6 Claims, 7 Drawing Sheets

Perform negotiation with a terminal to establish a session ID channel — S102

Acquire SIM card information allocated for the terminal by a network-side server — S104

Send the SIM card information to the terminal through the session ID channel — S106

(51) Int. Cl.
*H04W 4/06* (2009.01)
*H04W 8/18* (2009.01)
*H04W 12/03* (2021.01)
*H04W 12/40* (2021.01)

(56) References Cited

FOREIGN PATENT DOCUMENTS

WO       2015157933 A1    10/2015
WO   WO-2015157933 A1 * 10/2015 ............ H04W 12/04

* cited by examiner

METHOD AND DEVICE FOR DETERMINING SIM CARD INFORMATION

TECHNICAL FIELD

The present disclosure relates to the field of communication, and particularly, to a method and device for determining SIM card information.

BACKGROUND

At present, in the process of the number allocation of a virtual SIM card product, a master card is required to be prefabricated to connect a network and acquire a local access network parameter and disembodiment of a physical card is not actually implemented. The master card is required to have a network access right anywhere and a user, after being connected to the network, is required to acquire local SIM card information and then accesses the network by use of the acquired SIM card information. Such a flow is complex and an actual virtual SIM card is not implemented. In addition, when a virtual SIM card is applied, a large amount of SIM card information may also be preset and is required to include all SIM card information of regions where the virtual SIM card may be applied and the SIM card cannot be used once the user reaches an excluded place. Moreover, a large storage space is wasted to store the SIM card information.

The problem in a related art that a large storage space is wasted and a SIM card information acquisition flow is complex because SIM card information may be acquired only through a physical SIM card, there is yet no effective solution.

SUMMARY

Embodiments of the present disclosure provide methods and devices for determining SIM card information determination, intend to solve the problem in the related art that a large storage space is wasted and a SIM card information acquisition flow is complex because SIM card information may be acquired only through a physical SIM card.

According to an embodiment of the present disclosure, a method for determining SIM card information is provided, which may include that: negotiation with a terminal is performed to establish a session Identifier (ID) channel; SIM card information allocated for the terminal by a network-side server is acquired; and the SIM card information is sent to the terminal through the session ID channel.

In an embodiment, before the operation that negotiation with the terminal is performed to establish the session ID channel, the method may further include: broadcast information is sent to the terminal, the broadcast information containing a session ID configured to establish the session ID channel.

In an embodiment, the operation that the SIM card information allocated for the terminal by the network-side server is acquired may include: when it is monitored that the terminal activates the session ID, request information sent by the terminal and configured to request for the SIM card information is forwarded to a Broadcast Multicast Service Center (BM-SC);

the SIM card information acquired by the BM-SC from the network-side server according to the request information and corresponding to the request information is received.

In an embodiment, the operation that the SIM card information is sent to the terminal through the session ID channel may include: encryption processing is performed on the acquired SIM card information, and the SIM card information subjected to encryption processing is sent to the terminal through the session ID channel.

According to another embodiment of the present disclosure, a method for determining SIM card information is also provided, which may include that: negotiation with a base station is performed to establish a session ID channel; and SIM card information sent by the base station through the session ID channel is received.

In an embodiment, the operation that negotiation with the base station is performed to establish the session ID channel may include: broadcast information sent by the base station is received, the broadcast information containing a session ID configured to establish the session ID channel; and the session ID channel is established on the basis of the broadcast information containing the session ID.

In an embodiment, after the operation that the SIM card information sent by the base station through the session ID channel is received, the method may further include: feedback information is sent to the base station, the feedback information containing indication information configured to indicate that a terminal has used the SIM card information.

According to another embodiment of the present disclosure, a device for determining SIM card information is also provided, which may be applied to a base station and include: a first establishment module, configured to perform negotiation with a terminal to establish a session ID channel; an acquisition module, configured to acquire SIM card information allocated for the terminal by a network-side server; and a sending module, configured to send the SIM card information to the terminal through the session ID channel.

In an embodiment, the sending module may further be configured to send broadcast information to the terminal, the broadcast information containing a session ID configured to establish the session ID channel.

According to another embodiment of the present disclosure, a device for determining SIM card information is also provided, which may be applied to a terminal and include: a second establishment module, configured to perform negotiation with a base station to establish a session ID channel; and a receiving module, configured to receive SIM card information sent by the base station through the session ID channel.

In the embodiments of the present disclosure, a computer storage medium is also provided, which stores an executable instruction, the executable instruction being configured to execute implementation of the SIM card information determination method in the abovementioned embodiments.

Through the embodiments of the present disclosure, the SIM card information may be sent to the terminal through the session ID channel and, furthermore, the phenomenon that the SIM card information may be acquired only through a physical SIM card form is avoided. With adoption of the technical solutions, the problem in the related art that a large storage space is wasted and a SIM card information acquisition flow is complex because the SIM card information may be acquired only through a physical SIM card is solved, the physical SIM card form is not required, cost is greatly reduced and, meanwhile, a SIM card information acquisition process is simplified.

BRIEF DESCRIPTION OF THE DRAWINGS

The drawings described here are adopted to provide a further understanding to the present disclosure and form a part of the application. Schematic embodiments of the present disclosure and descriptions thereof are adopted to explain the present disclosure and not intended to form improper limits to the present disclosure. In the drawings.

DETAILED DESCRIPTION OF THE EMBODIMENTS

The present disclosure will be described below with reference to the drawings and in combination with the embodiments in detail. It is to be noted that the embodiments in the application and characteristics in the embodiments may be combined with conflicts.

It is to be noted that the terms like "first" and "second" in the specification, claims and drawings of the present disclosure are adopted not to describe a specific sequence or order but to distinguish similar objects.

The steps presented in the flowcharts of the drawings can be executed in a computer system like a set of computer executable instructions. Moreover, although logical sequences are shown in the flowcharts, in some cases, the presented or described steps can be executed in sequences different from those described here.

Embodiment 1

Figure 1:
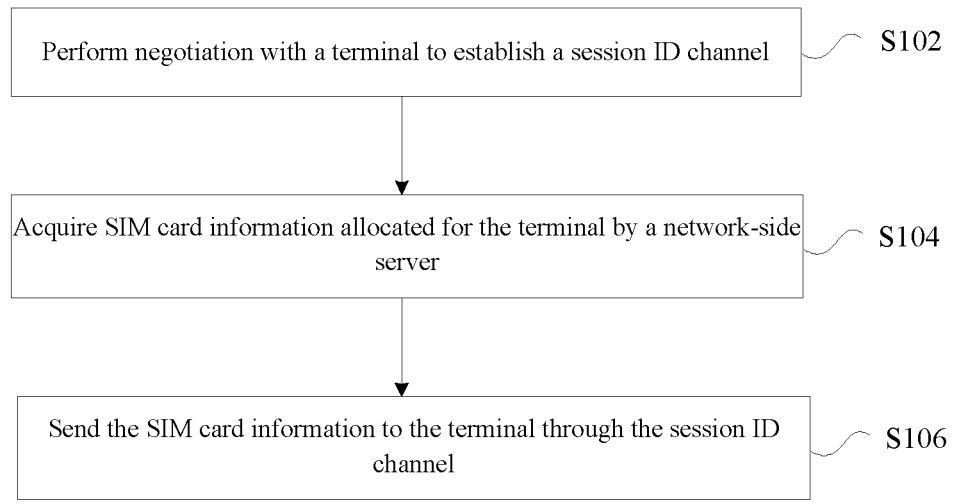
FIG. 1 is a first flowchart of a method for determining SIM card information according to an embodiment of the present disclosure.

In the embodiment of the present disclosure, a method for determining SIM card information is provided. FIG. 1 is a first flowchart of a method for determining SIM card information according to an embodiment of the present disclosure. As shown in FIG. 1, the method includes the following steps.

In S102, negotiation with a terminal is performed to establish a session ID channel.

In S104, SIM card information allocated for the terminal by a network-side server is acquired.

In S106, the SIM card information is sent to the terminal through the session ID channel.

Through the above steps, the SIM card information may be sent to the terminal through the session ID channel and, furthermore, the phenomenon that the SIM card information may be acquired only through a physical SIM card form is avoided. With adoption of the technical solutions, the problem in the related art that a large storage space is wasted and a SIM card information acquisition flow is complex because the SIM card information may be acquired only through a physical SIM card is solved, the physical SIM card form is not required, cost is greatly reduced and, meanwhile, a SIM card information acquisition process is simplified.

It is to be noted that the network-side server of the embodiment of the present disclosure is configured to store, allocate and manage SIM information of multiple terminals.

In an embodiment, before S102 is executed, the following technical solution may also be executed: broadcast information is sent to the terminal, the broadcast information containing a session ID configured to establish the session ID channel. The terminal, after receiving the broadcast information, activates the session ID in the broadcast information and further establishes the session ID channel.

Furthermore, when it is monitored that the terminal activates the session ID, request information sent by the terminal and configured to request for the SIM card information is forwarded to a BM-SC; and the SIM card information acquired by the BM-SC from the network-side server according to the request information and corresponding to the request information is received.

For example, for an Evolved Multimedia Broadcast Multicast Service (eMBMS), an implementation process of S102 will be described below in combination with an example. However, the embodiment of the present disclosure is not limited.

Figure 2:
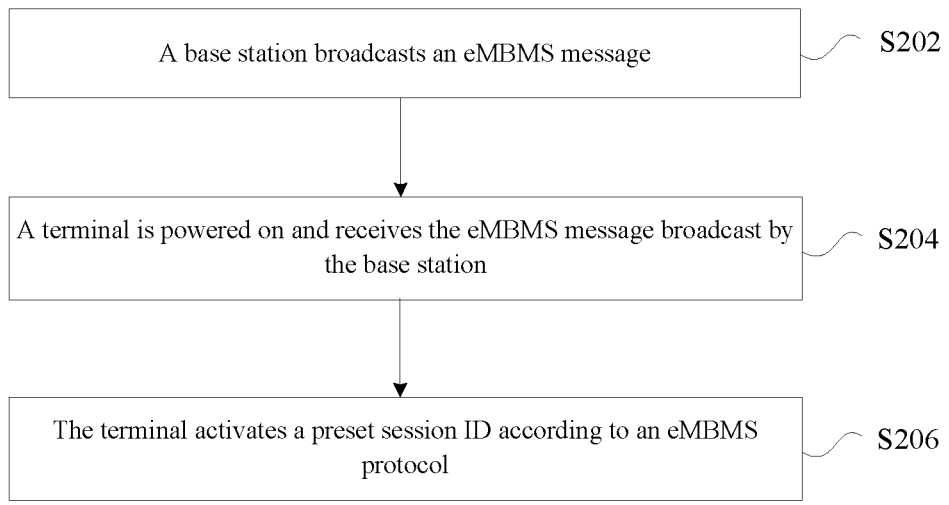
FIG. 2 is a flowchart according to an embodiment of the present disclosure.

FIG. 2 is a flowchart according to an example of the present disclosure. As shown in FIG. 2, the process mainly includes the following steps.

In S202, a base station broadcast an eMBMS message.

In S204, the terminal is powered on and receives the eMBMS message broadcast by the base station.

In S206, the terminal activates the preset session ID according to an eMBMS protocol.

For S202, S204 and S206 in FIG. 2, a data path between the terminal and the base station is required to be established according to the eMBMS protocol to complete transmission of required information. S202 requires the terminal to write the session ID configured to receive a SIM card parameter data packet in advance and the session ID is adopted for an activation process in S206.

In an embodiment, the following implementation manners are mainly adopted for S104.

A First Implementation Manner

The acquired SIM card information is sent to the terminal through the channel corresponding to the session ID.

A Second Implementation Manner encryption processing is performed on the acquired SIM card information; and the SIM card information subjected to encryption processing is sent to the terminal.

It is to be noted that the first implementation manner and the second implementation manner may be combined for use when necessary.

Embodiment 2

Figure 3:
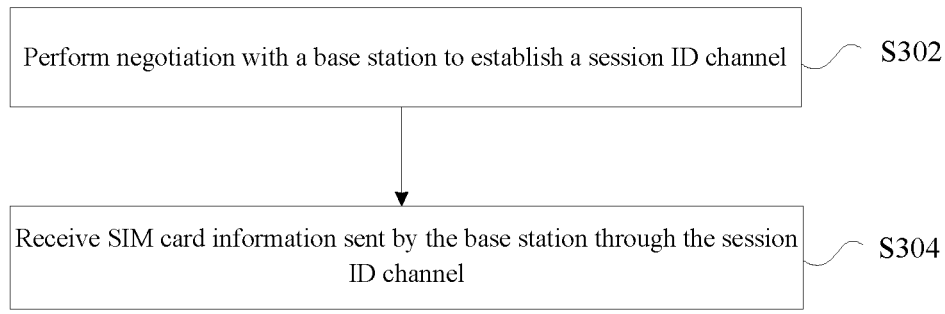
FIG. 3 is a second flowchart of a method for determining SIM card information according to an embodiment of the present disclosure.

The technical solutions of the embodiments are mainly described from a base station side in the above embodiment. For better understanding the technical solutions, the technical solutions of the embodiments of the present disclosure will be described below from a terminal side. In the embodiment of the present disclosure, a method for determining SIM card information is provided. FIG. 3 is a second flowchart of a method for determining SIM card information according to an embodiment of the present disclosure. As shown in FIG. 3, the method includes the following steps.

In S302, negotiation with a base station is performed to establish a session ID channel.

In S304, SIM card information sent by the base station through the session ID channel is received.

Through each step, the SIM card information sent by the base station through the session ID channel is received and, furthermore, the phenomenon that the SIM card information may be acquired only through a physical SIM card form is avoided. With adoption of the technical solutions, the problem in the related art that a large storage space is wasted and a SIM card information acquisition flow is complex because the SIM card information may be acquired only through a physical SIM card is solved, the physical SIM card form is not required, cost is greatly reduced and, meanwhile, a SIM card information acquisition process is simplified.

S302 may be executed in multiple implementation manners and, in an embodiment of the embodiment of the present disclosure, may be implemented through the following technical solution: broadcast information sent by the base station is received, the broadcast information containing a session ID configured to establish the session ID channel; and the session ID channel is established on the basis of the broadcast information containing the session ID. Specifically, a terminal activates the session ID and further establishes the session ID channel with the base station.

Figure 4:
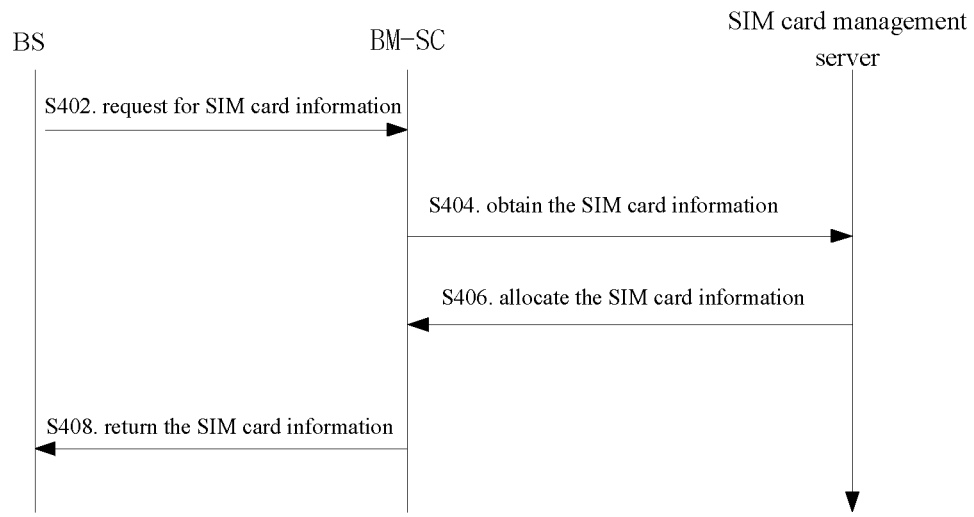
FIG. 4 is a flowchart of acquisition of SIM card information by a base station from a network-side server according to an embodiment of the present disclosure.

FIG. 4 is a flowchart of acquisition of SIM card information by a base station from a network-side server according to an embodiment of the present disclosure. As shown in FIG. 4, the flow includes the following steps.

In S402, the base station sends SIM card information request to a BM-SC.

In S404, the BM-SC acquires the SIM card information from a SIM card management server (equivalent to the network-side server in the abovementioned embodiment).

In S406, the SIM card management server allocates the SIM card information and sends the allocated SIM card information to the BM-SC.

In S408, the BM-SC returns the SIM card information to the base station.

In general, it is illustrated by FIG. 4 that the base station, after detecting that the terminal activates the fixed and preset session ID, requests the BM-SC for the SIM card information and the BM-SC, after receiving the request, acquires the SIM card information from the SIM card management server and returns the allocated SIM card information to the base station.

In an embodiment, the operation that the SIM card information sent by the base station is received may specifically be implemented through the following solution: the SIM card information sent by the base station through the channel corresponding to the session ID is received.

In the embodiment of the present disclosure, after the operation that the SIM card information sent by the base station is received, the method further includes that: feedback information is sent to the base station, the feedback information containing indication information configured to indicate that the terminal has used the SIM card information. The base station sends the feedback information to the network-side server through the BM-SC and the network-side server, after receiving the feedback information, marks the SIM card information in a used state.

Through the descriptions about the above implementation modes, those skilled in the art may clearly know that the methods according to the embodiments may be implemented in a manner of combining software and a required universal hardware platform and, of course, may also be implemented through hardware. However, the former is a preferred implementation mode under many circumstances. Based on such an understanding, the technical solutions of the present disclosure substantially or parts contributing to the conventional art may be embodied in form of software product. The computer software product is stored in a storage medium (for example, a Read-Only Memory (ROM)/Random Access Memory (RAM), a magnetic disk and an optical disk), including a plurality of instructions configured to enable a terminal device (which may be a mobile phone, a computer, a server, a network device or the like) to execute the methods of each embodiment of the present disclosure.

Embodiment 3

In the embodiment, a device for determining SIM card information is also provided. The device is applied to a base station and is configured to implement the abovementioned embodiments and preferred implementation modes. What has been described will not be elaborated. For example, term "module", used below, may be a combination of software and/or hardware realizing a predetermined function. Although the device described in the following embodiment is preferably implemented by the software, implementation by the hardware or the combination of the software and the hardware is also possible and conceivable.

Figure 5:
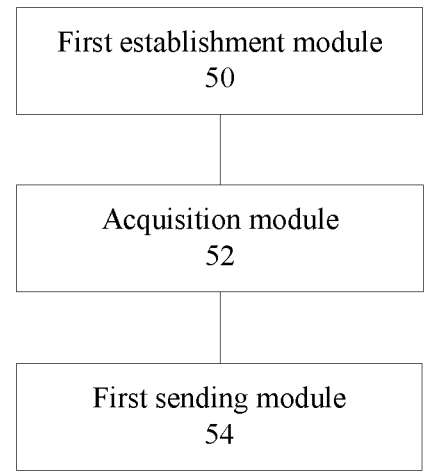
FIG. 5 is a first structure block diagram of a device for determining SIM card information according to an embodiment of the present disclosure.

FIG. 5 is a first structure block diagram of a device for determining SIM card information according to an embodiment of the present disclosure. As shown in FIG. 5, the device includes:

a first establishment module 50, which is configured to perform negotiation with a terminal to establish a session ID channel;

an acquisition module 52, which is configured to acquire SIM card information allocated for the terminal by a network-side server; and a first sending module 54, which is configured to send the SIM card information to the terminal through the session ID channel.

Through the actions of the above modules, the SIM card information may be sent to the terminal through the session ID channel and, furthermore, the phenomenon that the SIM card information may be acquired only through a physical SIM card form is avoided. With adoption of the technical solutions, the problem in the related art that a large storage space is wasted and a SIM card information acquisition flow is complex because the SIM card information may be acquired only through a physical SIM card is solved, the physical SIM card form is not required, cost is greatly reduced and, meanwhile, a SIM card information acquisition process is simplified.

In an embodiment, the first sending module 54 is configured to send broadcast information to the terminal, the broadcast information containing a session ID configured to establish the session ID channel.

Figure 6:
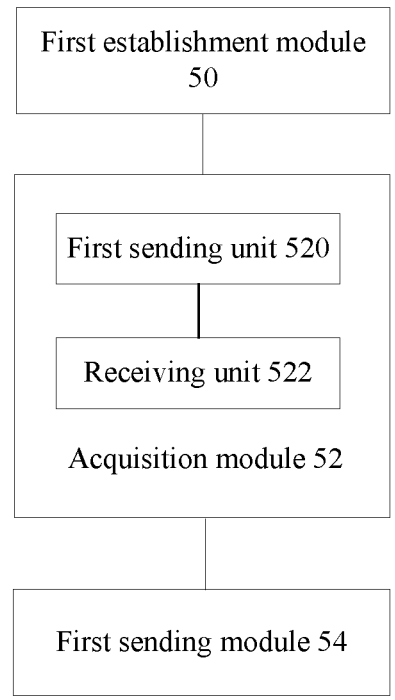
FIG. 6 is a second structure block diagram of a device for determining SIM card information according to an embodiment of the present disclosure

FIG. 6 is a second structure block diagram of a device for determining SIM card information according to an embodiment of the present disclosure. As shown in FIG. 6, the acquisition module 52 includes:

a first sending unit 520, which is configured to, when it is monitored that the terminal activates the session ID, forward request information sent by the terminal and configured to request for the SIM card information to an BM-SC; and a receiving module 522, which is configured to receive the SIM card information acquired by the BM-SC from the network-side server according to the request information and corresponding to the request information.

In an embodiment, the first sending module 52 is further configured to send the acquired SIM card information to the terminal through the channel corresponding to the session ID.

Figure 7:
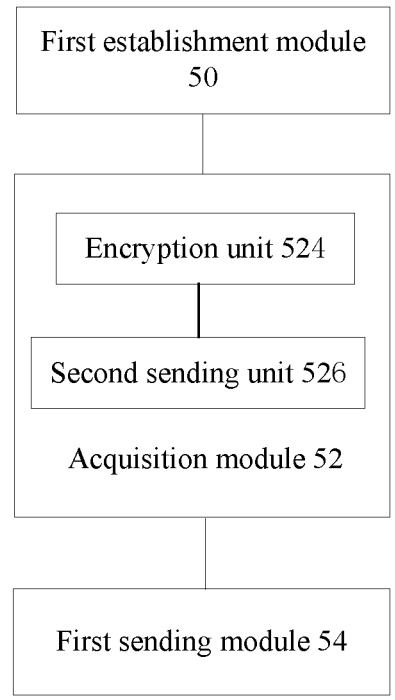
FIG. 7 is a third structure block diagram of a device for determining SIM card information according to an embodiment of the present disclosure

FIG. 7 is a third structure block diagram of a device for determining SIM card information according to an embodiment of the present disclosure. As shown in FIG. 7, the acquisition module 52 includes:

an encryption unit 524, which is configured to perform encryption processing on the acquired SIM card information; and a second sending unit 526, which is configured to send the SIM card information subjected to encryption processing to the terminal.

Embodiment 4

In the embodiment, a device for determining SIM card information is also provided. The device is applied to a terminal and is configured to implement the abovementioned embodiments and preferred implementation modes. What has been described will not be elaborated. For example, term "module", used below, may be a combination of software and/or hardware realizing a predetermined function. Although the device described in the following embodiment is preferably implemented by the software, implementation by the hardware or the combination of the software and the hardware is also possible and conceivable.

Figure 8:
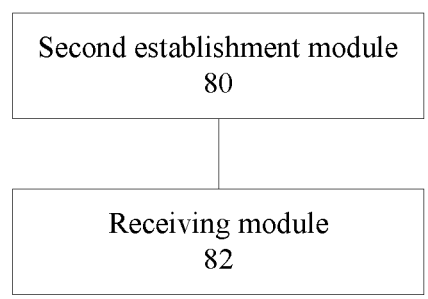
FIG. 8 is a fourth structure block diagram of a device for determining SIM card information according to an embodiment of the present disclosure

FIG. 8 is a fourth structure block diagram of a device for determining SIM card information according to an embodiment of the present disclosure. As shown in FIG. 8, the device includes:

a second establishment module 80, which is configured to perform negotiation with a base station to establish a session ID channel; and a receiving module 82, which configured to receive SIM card information sent by the base station through the session ID channel.

Through the above modules, the SIM card information sent by the base station through the session ID channel is received and, furthermore, the phenomenon that the SIM card information may be acquired only through a physical SIM card form is avoided. With adoption of the technical solutions, the problem in the related art that a large storage space is wasted and a SIM card information acquisition flow is complex because the SIM card information may be acquired only through a physical SIM card is solved, the physical SIM card form is not required, cost is greatly reduced and, meanwhile, a SIM card information acquisition process is simplified.

Figure 9:
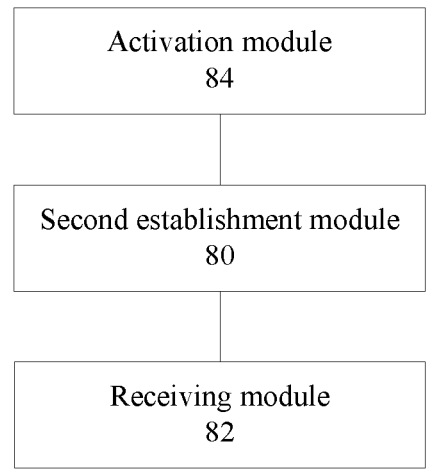
FIG. 9 is a fifth structure block diagram of a device for determining SIM card information according to an embodiment of the present disclosure

FIG. 9 is a fifth structure block diagram of a device for determining SIM card information according to an embodiment of the present disclosure. As shown in FIG. 9, the device further includes an activation module 84.

The receiving module 82 is further configured to receive broadcast information of the base station.

The activation module 84 is configured to, after indication information is received, activate a preset session ID. The base station, when it is monitored that the terminal activates the session ID, sends request information for requesting for the SIM card information to a BM-SC and receives the SIM card information acquired by the BM-SC from a network-side server according to the request information and corresponding to the request information.

Figure 10:
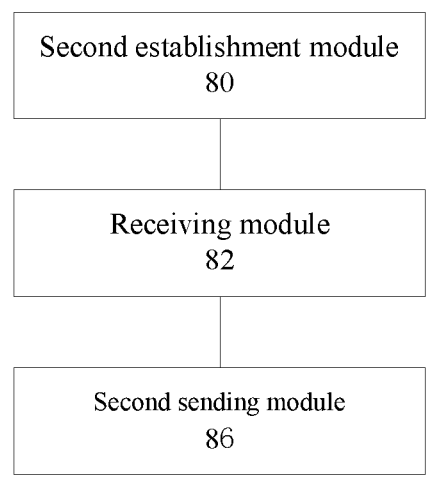
FIG. 10 is a sixth structure block diagram of a device for determining SIM card information according to an embodiment of the present disclosure

FIG. 10 is a sixth structure block diagram of a device for determining SIM card information according to an embodiment of the present disclosure. As shown in FIG. 10, the device further includes a second sending module 86, configured to send feedback information to the base station, the feedback information containing indication information configured to indicate that a terminal has used the SIM card information. The base station sends the feedback information to the network-side server through the BM-SC and the network-side server, after receiving the feedback information, marks the SIM card information in a used state.

It is to be noted that each module may be implemented through software or hardware and, for the latter condition, may be implemented in, but not limited to, the following manners: the modules are all located in the same processor, or, the modules are located in different processors in a free combination form respectively.

In order to better understand a SIM card information determination flow, the technical solutions will be explained and described below in combination with multiple embodiments. However, the embodiments of the present disclosure are not limited.

Preferred Example 1

Figure 11:
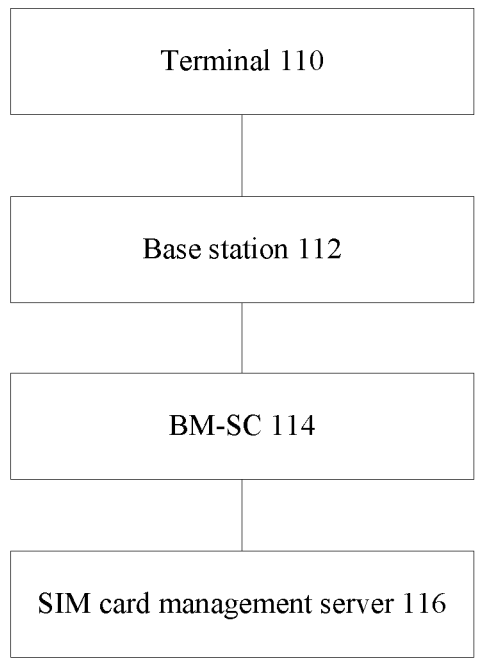
FIG. 11 is a schematic diagram of a structure applied to a method for writing a SIM card into a terminal according to a preferred embodiment of the present disclosure.

FIG. 11 is a schematic diagram of a structure applied to a method for writing a SIM card into a terminal according to a preferred example of the present disclosure. As shown in FIG. 11, the structure includes:

a terminal 110, which may be a mobile phone, a routing device with a wireless function and other User Equipment (UE) with characteristics of accessing Long Term Evolution (LTE) and supporting an eMBMS;

a base station 112, which is required to support the eMBMS;

a BM-SC 114, which may support intercommunication with a SIM card management server; and the SIM card management server 116 (equivalent to the network-side server of the abovementioned embodiments), which allocates, manages and deregisters SIM card information and may receive information of the BM-SC.

Figure 12:
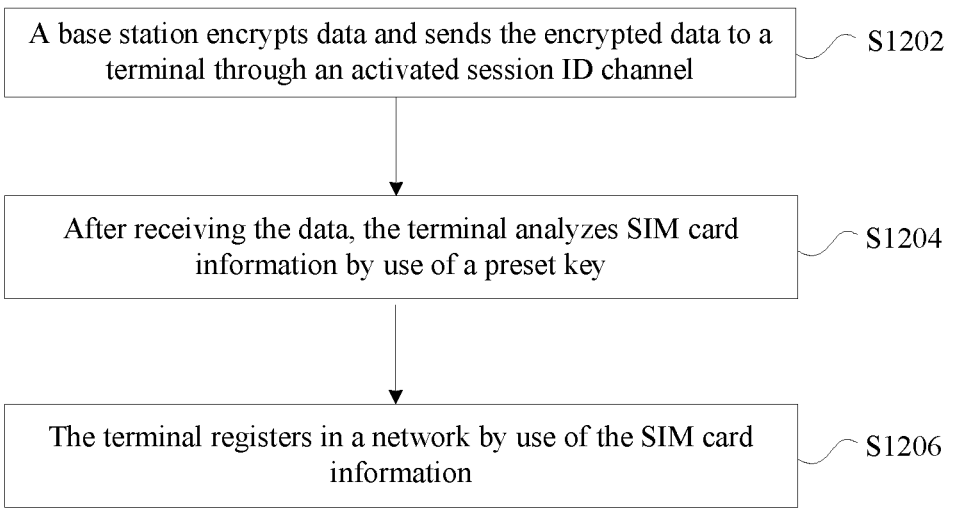
FIG. 12 is a flowchart of a registration process of a terminal in a network according to a preferred embodiment of the present disclosure.

On the basis of FIG. 11, FIG. 12 is a flowchart of a registration process of a terminal in a network according to a preferred embodiment of the present disclosure. As shown in FIG. 12, the process includes the following steps.

In S1202, the base station encrypts data and sends the encrypted data to the terminal through an activated session ID channel.

In S1204, the terminal, after receiving the data, analyzes SIM card information by use of a preset key.

In S1206, the terminal registers in the network by use of the SIM card information.

It is illustrated in FIG. 12 that the base station, after S1202 is executed, sends the data to the terminal and the terminal is required to execute S1204 and S1206 to complete registration in the network. The registration process in the network is required to be executed according to a process in FIG. 13.

Figure 13:
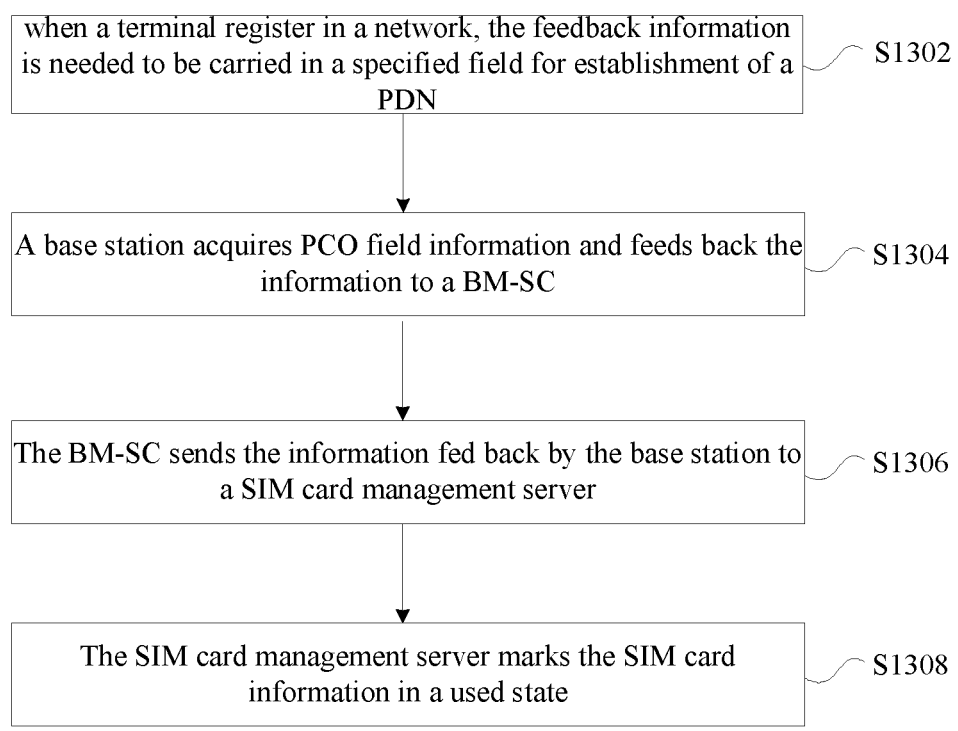
FIG. 13 is a flowchart of registration of a terminal in a network according to an embodiment of the present disclosure.

FIG. 13 is a flowchart of registration of a terminal in a network according to an embodiment of the present disclosure. As shown in FIG. 13, the flow includes the following steps.

In S1302, the terminal, during registration in the network, is required to contain feedback information in a specified field (which may be, for example, a PCO reserved field) for establishment of a Public Data Network (PDN).

In S1304, the base station acquires PCO field information and feeds back the information to the BM-SC.

In S1306, the BM-SC sends the information fed back by the base station to the SIM card management server.

In S1308, the SIM card management server marks the SIM card information in a used state.

From the above, the technical solutions may substantially be summarized as follows: the terminal is required to report that the acquired SIM card information has been used, the base station, after acquiring the information, is required to mark the information immediately and denies registration of another reporting terminal and the denied terminal is required to wait for receiving new SIM card information. The base station analyzes the fed back SIM card information from a PDN establishment request initiated by the terminal and feeds back the information to the SIM card management server through the BM-SC. The SIM card management server marks whether the card information has been used or not through the fed back SIM card information, the feedback information in the PCO reserved field including information such as an International Mobile Subscriber Identification Number (IMSI) and a SIM card information acquisition success mark and being configured for the SIM card management server to mark locally managed SIM card allocation.

If registration of the terminal in the network by use of the SIM card information is denied, the terminal is required to continue waiting for the network to transmit a new SIM card parameter and S1202~S1206 are cyclically executed until successful registration.

According to the embodiments of the present disclosure, no master card is required and cost is reduced; SIM card number allocation may be implemented without connection to the network; and presetting of a large amount of SIM card information is avoided and a storage space of the terminal is saved. Compared with a conventional virtual SIM card manner, the technical solution has the advantages that hardware cost is reduced and SIM card information for registration in related local networks for further connection to the networks may also be acquired in different regions.

Preferred Example 2

Preferred example 2 of the present disclosure is based on an eMBMS protocol and a terminal is not required to register on an LTE network to acquire a SIM card parameter. In the preferred embodiment of the present disclosure, the terminal is required to preset a set of decoding keys configured to analyze a data packet transmitted by the network. The terminal, when a PDN is established, may contain a parameter with a fixed meaning in a PCO reserved field for sending to the network. In the preferred embodiment of the present disclosure, a network-side device may transmit the SIM card parameter to the terminal through a fixed session ID of the eMBMS protocol and encrypts transmitted data. The network may acquire the PCO reserved field in a PDN request of the terminal to acquire and analyze the parameter with the fixed meaning to record a state that SIM card information has been transmitted and used by the terminal. The parameter contained in the PCO reserved field is information such as a cell ID and an IMSI.

In the presence of the terminal and network with the above capabilities, SIM card parameter updating is completed according to the following steps.

In a first step, the terminal receives a broadcast message of the network, acquires a supported session list according to the eMBMS protocol, selects the fixed session ID as a default and tries activation.

In a second step, after session activation, the terminal receives the data packet transmitted by the network, analyzes the data by use of the preset key and analyzes the related SIM card information.

In a third step, registration in the LTE network is performed again by use of the SIM card information and the related information is contained in the PCO reserved field in the PDN request.

In a fourth step, the network receives the information in the PCO reserved field, analyzes the related information and feeds back information about that the SIM card has been used to the SIM card management server.

From the above, the problem in the related art that a large storage space is wasted and a SIM card information acquisition flow is complex because SIM card information may be acquired only through a physical SIM card is solved, the physical SIM card form is not required, cost is greatly reduced and, meanwhile, a SIM card information acquisition process is simplified.

An embodiment of the present disclosure also provides a storage medium. In an embodiment, in the embodiment, the storage medium may be configured to store a program code configured to execute the following steps.

In S1, negotiation with a terminal is performed to establish a session ID channel.

In S2, SIM card information allocated for the terminal by a network-side server is acquired.

In S3, the SIM card information is sent to the terminal through the session ID channel.

An embodiment of the present disclosure also provides a storage medium. In an embodiment, in the embodiment, the storage medium may be configured to store a program code configured to execute the following steps.

In S1, negotiation with a base station is performed to establish a session ID channel.

In S2, SIM card information sent by the base station through the session ID channel is received.

In an embodiment, in the embodiment, the storage medium may include, but not limited to, various media capable of storing program codes such as a U disk, a ROM, a RAM, a mobile hard disk, a magnetic disk or an optical disk.

In an embodiment, specific examples in the embodiment may refer to examples described in the abovementioned embodiments and optional implementation modes and will not be elaborated in the embodiment.

It is apparent that those skilled in the art should know that each module or each step of the present disclosure may be implemented by a universal computing device, and the modules or steps may be concentrated on a single computing device or distributed on a network formed by a plurality of computing devices, and may in an embodiment be implemented by program codes executable for the computing devices, so that the modules or the steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. Therefore, the present disclosure is not limited to any specific hardware and software combination.

The above is only the exemplary embodiments of the present disclosure and not intended to limit the present disclosure. For those skilled in the art, the present disclosure may have various modifications and variations. Any modifications, equivalent replacements, improvements and the like made within the spirit and principle of the present disclosure shall fall within the scope of protection of the present disclosure.

INDUSTRIAL APPLICABILITY

The technical solutions provided in the embodiments of the present disclosure may be applied to a SIM card information determination process, the SIM card information may be sent to the terminal through the session ID channel and, furthermore, the phenomenon that the SIM card information may be acquired only through a physical SIM card form is avoided. With adoption of the technical solutions, the problem in the related art that a large storage space is wasted and a SIM card information acquisition flow is complex because the SIM card information may be acquired only through a physical SIM card is solved, the physical SIM card form is not required, cost is greatly reduced and, meanwhile, a SIM card information acquisition process is simplified.

What is claimed is:

1. A method for determining Subscriber Identity Module (SIM) card information, comprising:
    performing negotiation with a terminal to establish a session Identifier (ID) channel;
    acquiring SIM card information allocated for the terminal by a network-side server; and
    sending the SIM card information to the terminal through the session ID channel;
    before performing negotiation with the terminal to establish the session ID channel, further comprising:
    sending broadcast information to the terminal, the broadcast information containing a session ID configured to establish the session ID channel;
    wherein acquiring the SIM card information allocated for the terminal by the network-side server comprises:
    when it is monitored that the terminal activates the session ID, forwarding request information sent by the terminal and configured to request for the SIM card information to a Broadcast Multicast Service Center (BM-SC); and
    receiving the SIM card information acquired by the BM-SC from the network-side server according to the request information and corresponding to the request information.

2. The method as claimed in claim 1, wherein sending the SIM card information to the terminal through the session ID channel comprises:
    performing encryption processing on the acquired SIM card information; and
    sending the SIM card information subjected to encryption processing to the terminal through the session ID channel.

3. A method for determining Subscriber Identity Module (SIM) card information, comprising:
    performing negotiation with a base station to establish a session Identifier (ID) channel; and
    receiving SIM card information sent by the base station through the session ID channel;
    after receiving the SIM card information sent by the base station through the session ID channel, further comprising:
    sending feedback information to the base station, the feedback information containing indication information configured to indicate that a terminal has used the SIM card information.

4. The method as claimed in claim 3, wherein performing negotiation with the base station to establish the session ID channel comprises:
    receiving broadcast information sent by the base station, the broadcast information containing a session ID configured to establish the session ID channel; and
    establishing the session ID channel on the basis of the broadcast information containing the session ID.

5. A Subscriber Identity Module (SIM) card information determination device, applied to a base station and comprising:
    a first establishment module, configured to perform negotiation with a terminal to establish a session Identifier (ID) channel;
    an acquisition module, configured to acquire SIM card information allocated for the terminal by a network-side server; and
    a sending module, configured to send the SIM card information to the terminal through the session ID channel;
    wherein the sending module is further configured to send broadcast information to the terminal, the broadcast information containing a session ID configured to establish the session ID channel;
    wherein the acquisition module is further configured to, when it is monitored that the terminal activates the session ID, forward request information sent by the terminal and configured to request for the SIM card information to a Broadcast Multicast Service Center (BM-SC); and receive the SIM card information acquired by the BM-SC from the network-side server according to the request information and corresponding to the request information.

6. A device for determining Subscriber Identity Module (SIM) card information, applied to a terminal and comprising:
    a second establishment module, configured to perform negotiation with a base station to establish a session Identifier (ID) channel; and
    a receiving module, configured to receive SIM card information sent by the base station through the session ID channel;
    the device is further configured to send feedback information to the base station, the feedback information containing indication information configured to indicate that a terminal has used the SIM card information.

* * * * *